(12) United States Patent
Kennoy et al.

(10) Patent No.: US 10,335,623 B2
(45) Date of Patent: Jul. 2, 2019

(54) NON-FLAMMABLE COMPOSITIONS OF CHLORO-TRIFLUOROPROPENE

(75) Inventors: Debra H. Kennoy, Glendora, NJ (US); Brett L. Van Horn, Wayne, PA (US); Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/118,337

(22) PCT Filed: May 17, 2012

(86) PCT No.: PCT/US2012/038264
§ 371 (c)(1),
(2), (4) Date: Nov. 18, 2013

(87) PCT Pub. No.: WO2012/158870
PCT Pub. Date: Nov. 22, 2012

(65) Prior Publication Data
US 2014/0070129 A1    Mar. 13, 2014

Related U.S. Application Data

(60) Provisional application No. 61/487,790, filed on May 19, 2011.

(51) Int. Cl.
| | | |
|---|---|---|
| *A62D 1/00* | (2006.01) |
| *C09K 3/30* | (2006.01) |
| *C11D 7/50* | (2006.01) |
| *C09K 5/04* | (2006.01) |
| *C09K 3/00* | (2006.01) |
| *C10M 171/00* | (2006.01) |
| *C11D 7/30* | (2006.01) |
| *C08J 9/14* | (2006.01) |

(52) U.S. Cl.
CPC ............ *A62D 1/0028* (2013.01); *C08J 9/144* (2013.01); *C09K 3/00* (2013.01); *C09K 3/30* (2013.01); *C09K 5/044* (2013.01); *C09K 5/045* (2013.01); *C10M 171/008* (2013.01); *C11D 7/30* (2013.01); *C11D 7/5018* (2013.01); *C11D 7/5054* (2013.01); *C08J 2203/162* (2013.01); *C08J 2203/202* (2013.01); *C09K 2205/122* (2013.01); *C09K 2205/126* (2013.01); *C10N 2220/30* (2013.01); *C10N 2220/301* (2013.01); *C10N 2230/00* (2013.01)

(58) Field of Classification Search
None
See application file for complete search history.

(56) References Cited

U.S. PATENT DOCUMENTS

| | | |
|---|---|---|
| 5,811,603 A | 9/1998 | Elsheikh |
| 8,703,690 B2 | 4/2014 | Van Horn et al. |
| 9,222,705 B2 | 12/2015 | Van Horn et al. |
| 2009/0253820 A1 | 10/2009 | Bowman et al. |
| 2009/0305876 A1 | 12/2009 | Singh et al. |
| 2010/0139274 A1 | 6/2010 | Zyhowski et al. |
| 2011/0039964 A1 | 2/2011 | Wiliams et al. |
| 2011/0041529 A1 | 2/2011 | Chen et al. |
| 2011/0303867 A1 | 12/2011 | Ling et al. |
| 2012/0043492 A1 | 2/2012 | Williams et al. |
| 2013/0065044 A1 | 3/2013 | Bowman et al. |

FOREIGN PATENT DOCUMENTS

| | | | | |
|---|---|---|---|---|
| WO | WO 2009003165 A1 | * | 12/2008 | ............ C08F 2/42 |
| WO | WO 2010/077898 A2 | | 7/2010 | |

* cited by examiner

*Primary Examiner* — Tanisha Diggs
(74) *Attorney, Agent, or Firm* — Steven D. Boyd

(57) ABSTRACT

The present invention relates to non-flammable compositions comprising chlorotrifluoropropene with reduced risk of flammability which are useful as refrigerants, heat transfer fluids, solvents, cleaners, blowing agents, aerosols, extraction fluids, and the like.

6 Claims, No Drawings

NON-FLAMMABLE COMPOSITIONS OF CHLORO-TRIFLUOROPROPENE

The present application claims priority to International Application serial number PCT/US12/038264 tiled May 17, 2012, which claims priority to U.S. provisional application Ser. No. 61/487,790 filed May 19, 2011.

SUMMARY OF INVENTION

The present invention relates to non-flammable compositions comprising chlorotrifluoropropene with reduced risk of flammability which are useful as refrigerants, heat transfer fluids, solvents, cleaners, blowing agents, aerosols, extraction fluids, and the like.

BACKGROUND OF INVENTION

Fluorocarbon fluids, such as chlorofluorocarbons (CFCs), hydrochlorofluorocarbons (HCFCs) and hydrofluorocarbons (HFCs), are found in widespread use in many applications including refrigeration and air-conditioning, heat pumps, foaming agents, solvents, cleaners, extraction fluids, aerosols, flame suppressants, and the like. Many of these fluorocarbons have relatively high global warming potential (GWP) and, for CFCs and HCFC, may contribute to stratospheric ozone depletion. With the growing emphasis on climate change there is a growing need to identify environmentally sustainable alternatives to the fluorocarbon fluids.

1-Chloro-3,3,3-trifluoropropene (HCFO-1233zd) is a potential replacement for some fluorocarbon fluids, where it possesses beneficially very low GWP and a very low ozone depletion potential.

Flammability is an important property for many applications where it is very important or essential for the composition to be non-flammable, particularly refrigerant and heat transfer applications. There are various methods of measuring the flammability of compounds and compositions, such as ASTM E 681-01 as specified by ASHRAE Addendum 34p-92 or by measuring the flash point, as applicable.

DETAILED DESCRIPTION OF INVENTION

The present invention relates to compositions comprising chlorotrifluoropropene, such as 1-chloro-3,3,3-trifluoropropene (HCFO-1233zd), with reduced risk of flammability which are useful as refrigerants, heat transfer fluids, solvents, cleaners, blowing agents, aerosols, extraction fluids, and the like. Applicants discovered that to ensure that compositions comprising HCFO-1233zd are non-flammable that the quantity of specific additional components, particularly selected hydrofluoroolefins such as 1,3,3,3-tetrafluoropropene (HFO-1234ze), must be minimized and maintained within a particularly narrow range. This is surprising, especially considering that HFO-1234ze has been reported as not flammable at ambient temperature (see Singh and Shankland, Int. Symp. Non-CO2 Greenhouse Gases, Wageningen, Netherlands, Jun. 30-Jul. 3, 2009) and therefore not expected to have a significant impact on the flammability of compositions comprising another compound such as HCFO-1233zd.

The chlorotrifluoropropene of the present invention is preferably 1-chloro-3,3,3-trifluoropropene (HCFO-1233zd) and/or 2-chloro-3,3,3-trifluoropropene (HCFO-1233xf), most preferably 1-chloro-3,3,3-trifluoropropene (HCFO-1233zd).

In one embodiment of the present invention, the non-flammable compositions comprise HCFO-1233zd containing cis- and/or trans-1,3,3,3-tetrafluoropropene (HFO-1234ze), particularly the trans-isomer, at less than 5 wt %, preferably less than 4 wt %, preferably less than 3 wt %, preferably less than 2 wt %, more preferably less than 1 wt %, more preferably less than 0.7 wt %, more preferably less than 0.5 wt %, more preferably less than 0.3wt %, more preferably less than 0.25 wt %, more preferably less than 0.2 wt %, more preferably less than 0.1 wt %, even more preferably less than 0.05 wt %, even more preferably less than 0.01 wt %, even more preferably less than about 0.005 wt %, and even more preferably less than about 0.003 wt %. In another embodiment of the presentation invention, the non-flammable compositions comprise HCFO-1233zd containing HFO-1234ze, particularly the trans-isomer, at between 5 wt % and 0.003 wt %. In another embodiment of the presentation invention, the non-flammable compositions comprise HCFO-1233zd containing HFO-1234ze, particularly the trans-isomer, at between 4 wt % and 0.003 wt %. In another embodiment of the presentation invention, the non-flammable compositions comprise HCFO-1233zd containing HFO-1234ze, particularly the trans-isomer, at between 2 wt % and 0.003 wt %.

In another embodiment of the present invention, the non-flammable compositions comprise HCFO-1233zd containing 3,3,3-trifluoropropene (HFO-1243zf) at less than 5 wt %, preferably less than 2 wt %, more preferably less than 1 wt %, more preferably less than 0.7 wt %, more preferably less than 0.5 wt %, more preferably less than 0.3 wt %, more preferably less than 0.2 wt %, more preferably less than 0.1 wt %, even more preferably less than 0.05 wt %, even more preferably less than 0.02%, even more preferably less than 0.01 wt %, even more preferably less than 0.003 wt %, even more preferably less than 0.0002 wt %, and even more preferably less than 0.00004 wt %. In another embodiment of the present invention, the compositions comprise HCFO-1233zd containing HFO-1243zf at between 0.7 wt % and 0.00004 wt %.

In another embodiment of the present invention the non-flammable composition also comprises HFC-245fa, preferably at less than 50 wt %, more preferably less than 10 wt %, more preferably less than 5 wt %, more preferably less than 1 wt %, more preferably less than 0.5 wt %, more preferably less than 0.2 wt %, even more preferably less than 0.1 wt %, even more preferably less than 0.01 wt %. In another embodiment of the presentation invention, the non-flammable compositions comprise HCFO-1233zd containing HFC-245fa at between 5 wt % and 0.003 wt %

In a highly preferred embodiment of the present invention, the non-flammable compositions are liquid compositions comprising HCFO-1233zd containing trans-1,3,3,3-tetrafluoropropene (trans-HFO-1234ze) at less than 0.25 wt %.

In a highly preferred embodiment of the present invention are compositions comprising HCFO-1233zd containing trans-1,3,3,3-tetrafluoropropene (trans-HFO-1234ze) from 0.003 wt % to 2 wt % and 3,3,3-trifluoropropene (HFO-1243zf) from 0.00004 wt % to 0.7 wt %.

In a highly preferred embodiment of the present invention are liquid compositions comprising HCFO-1233zd containing trans-1,3,3,3-tetrafluoropropene (trans-HFO-1234ze) from 0.003 wt % to 0.2 wt % and 3,3,3-trifluoropropene (HFO-12434 from 0.00004 wt % to 0.08 wt %.

An embodiment of the present invention is compositions comprising HCFO-1233zd containing cis-1,3,3,3-tetrafluoropropene (cis-HFO-1234ze) from 0.002 wt % to 0.2 wt %

In a highly preferred embodiment of the present invention, the non-flammable compositions are liquid compositions comprising HCFO-1233zd containing trans-1,3,3,3-tetrafluoropropene (trans-HFO-1234ze) and 3,3,3-trifluoropropene (HFO-1243zf) at a combined total of less than 0.25 wt %.

In a highly preferred embodiment of the present invention, the non-flammable compositions are such that the vapor composition comprises HCFO-1233zd containing trans-1,3,3,3-tetrafluoropropene (trans-HFO-1234ze) at less than 2 wt %.

In a highly preferred embodiment of the present invention, the non-flammable compositions are such that the vapor composition comprises HCFO-1233zd containing trans-1,3,3,3-tetrafluoropropene (trans-HFO-1234ze) at less than 4 wt %.

Another embodiment of the present invention is compositions comprising HCFO-1233zd containing HFO-1234ze and HFO-1243zf at a combined amount of between about 3 wt % and 0.003 wt %.

In a highly preferred embodiment of the present invention, the non-flammable compositions are such that the vapor composition comprises HCFO-1233zd containing trans-1,3,3,3-tetrafluoropropene (trans-HFO-1234ze) and 3,3,3-trifluoropropene (HFO-1243zf) at a combined total of less than 3 wt %, preferably less than 2.75 wt %, more preferably less than 1 wt %, more preferably less than 0.7 wt %, more preferably less than 0.5 wt %, more preferably less than 0.3 wt %, more preferably less than 0.2 wt %, more preferably less than 0.1 wt %, even more preferably less than 0.05 wt %, even more preferably less than 0.01 wt %, and even more preferably less than 0.003 wt %.

In a highly preferred embodiment of the present invention, the non-flammable compositions are such that the vapor composition comprises HCFO-1233zd containing trans-1,3,3,3-tetrafluoropropene (trans-HFO-1234ze) and 3,3,3-trifluoropropene (HFO-1243zf) at a combined total of between 3 wt % and 0.003 wt %.

In a highly preferred embodiment of the present invention, the non-flammable compositions are such that the vapor composition comprises HCFO-1233zd containing trans-1,3,3,3-tetrafluoropropene (trans-HFO-1234ze) and 3,3,3-trifluoropropene (HFO-1243zf) at a combined total of less than 3 wt %, preferably less than 2.75 wt %, more preferably less than 1 wt %, more preferably less than 0.7 wt %, more preferably less than 0.5 wt %, more preferably less than 0.3 wt %, more preferably less than 0.2 wt %, more preferably less than 0.1 wt %, even more preferably less than 0.05 wt %, and even more preferably less than 0.01 wt %.

In flammability testing, HFO-1234ze is flammable, HFC-245fa is be non-flammable and HFO-1234ze is non-flammable at room temperature but flammable at higher temperature, e.g. 60° C. and 100° C.

The HCFO-1233zd may be trans-HCFO-1233zd, cis-HCFO-1233zd, and mixtures thereof. In certain embodiments of the present invention the HCFO-1233zd is predominantly the trans-isomer, preferably >70% the trans isomer, more preferably >90% the trans isomer, even more preferably >95% the trans isomer, even more preferably >99% the trans isomer, even more preferably >99.9%, even more preferably essentially the trans-isomer. In certain embodiments of the present invention the HCFO-1233zd is predominantly the cis-isomer, preferably >70% the cis isomer, more preferably >90% the cis isomer, even more preferably >95% the cis isomer, even more preferably >99% the cis isomer, even more preferably essentially the cis-isomer. In certain embodiments the HCFO-1233zd is from 25% to 75% the cis-isomer and from 75% to 25% the trans-isomer. In most preferred embodiments, the HCFO-1233zd is essentially the trans-isomer.

In one embodiment of the present invention, the non-flammable compositions are comprised of greater than 90% HCFO-1233zd, preferably greater than 95 wt % HCFO-1233zd, more preferably greater than 98 wt % HCFO-1233zd, even more preferably greater than 99 wt % HCFO-1233zd, even more preferably greater than 99.5 wt % HCFO-1233zd.

In a preferred embodiment of the present invention, the non-flammable compositions are comprised of 99.999% to 95% by weight of chlorotrifluoropropene.

In one embodiment of the present invention, the non-flammable compositions comprise HCFO-1233xf containing 2,3,3,3-tetrafluoropropene (HFO-1234yf) at less than 5 wt %, preferably less than 2 wt %, more preferably less than 1 wt %, more preferably less than 0.5 wt %, more preferably less than 0.3 wt %, more preferably less than 0.2 wt %, more preferably less than 0.1 wt %, even more preferably less than 0.05 wt %, and even more preferably less than 0.01 wt %. In another embodiment of the present invention, the non-flammable compositions comprise HCFO-1233xf containing from 0.001 wt % to about 5 wt % HFO-1234yf. In another embodiment of the present invention the non-flammable composition also comprises HFC-245eb and/or HFC-254cb, preferably at less than 50 wt %, more preferably less than 10 wt %, more preferably less than 5 wt %, more preferably less than 1 wt %, more preferably less than 0.5 wt %, more preferably less than 0.3 wt %, and even more preferably less than 0.1 wt %. In another embodiment of the present invention, the non-flammable compositions comprise HCFO-1233xf containing HFC-245eb and/or HFC-254cb from 0.001 wt % to about 50 wt %.

The compositions of the present invention may also comprise additional components including, but not limited to, hydrofluorocarbons (HFCs), hydrofluoroolefins (HFOs), hydrocarbons, hydrochlorofluoroolefins (HFCOs), chlorofluorocarbons (CFCs), chlorocarbons, hydrochlorofluorocarbons (HCFCs), C1 to C5 alcohols, C1 to C4 aldehydes, C1 to C4 ketones, fluoroketones, esters, C1 to C4 ethers, including hydrofluoroethers (HFEs), and diethers, dimethyl ether, methyl formate, methylal, carbon dioxide, and mixtures thereof. Preferably these additional components are present at such a level as to not significantly increase the flammability of the compositions of the present invention, more preferably the additional component or components are themselves non-flammable. Though not meant to limit the scope of the present invention in any way, examples of additional components are shown below:

(a) hydrofluorocarbons (HFCs) including but not limited to C1 to C5 alkanes possessing at least one fluorine and at least one hydrogen; preferably difluoromethane (HFC-32); 1,1,1,2,2-pentafluoroethane (HFC-125); 1,1,2,2-tetrafluoroethane (HFC-134); 1,1,1,2-tetrafluoroethane (HFC-134a); 1,1,1-trifluoroethane (HFC-143a); 1,1,2-trifluoroethane (HFC-143); 1,1-difluoroethane (HFC-152a); 1,2-difluoroethane (HFC-152); fluoroethane (HFC-161); 1,1,1,2,3,3,3-heptafluoropropane (HFC-227ea); 1,1,1,3,3-pentafluoropropane (HFC-245fa); 1,1,1,2,3-pentafluoropropane (HFC-245eb); 1,1,2,2,3-pentafluoropropane (HFC-245ca); 1,1,1,3,3,3-hexafluoropropane (HFC-236fa); 1,1,2,2-tetrafluoropropane (HFC-254cb); 1,1,1,3,3-pentafluorobutane (HFC-365mfc) and 1,1,1,2,2,3,4,5,5,5-decafluoropentane (HFC-4310mee), and mixtures thereof. Preferably the HFC is non-flammable, including, but not limited to, HFC-134a, HFC-245fa, HFC-227ea, HFC-125, HFC-4310mee, HFC-236fa, and mixtures thereof.

(b) hydrofluoroolefins including but not limited to pentafluoropropenes (HFO1225), tetrafluoropropenes (HFO1234), trifluoropropenes (HFO1243), all tetrafluorobutene isomers (HFO1354), all pentafluorobutene isomers (HFO1345), all hexafluorobutene isomers (HFO1336), all heptafluorobutene isomers (HFO1327), all heptafluoropentene isomers (HFO1447), all octafluoropentene isomers (HFO1438), all nonafluoropentene isomers (HFO1429), and mixtures thereof; preferably (cis and/or trans)-1,2,3,3,3-pentafluoropropene (HFO-1225ye), 3,3,3-trifluoropropene (HFO-1243zf), (cis and/or trans)-1,3,3,3-tetrafluoropropene (HFO-1234ze), 2,3,3,3-tetrafluoropropene (HFO-1234yf), (cis and/or trans)-1,1,1,3,3,3-hexafluorobutene (HFO-1336mzz). Preferably the hydrofluoroolefin is non-flammable, including, but not limited to, cis- and/or trans-HFO-1336mzz, pentafluoropropenes, and mixtures thereof.

(c) hydrocarbons including but not limited to hexane, pentane isomers, butane isomers, propane; preferably n-pentane, cyclopentane, iso-pentane. Butane is preferably iso-butane or n-butane. Though not preferred in this application at high concentrations due to their high flammability, it is understood that hydrocarbons may be present and are covered under the scope of this invention. In an embodiment of the present invention, the compositions of the present invention comprise hydrocarbons at less than 5 wt %; in another embodiment at less than 1 wt %; in another embodiment at 0.1 wt % to 1 wt %.

(d) C1 to C5 alcohols, C1 to C4 aldehydes, C1 to C4 ketones, fluoroketones, C1 to C4 ethers and diethers, esters, and carbon dioxide. Preferably the ester is of the formula R1-C(=O)—O—R2, where R1 is H or a C1 to C4 alkyl group and R2 is a C1 to C4 alkyl group; more preferably were the ester is methyl formate. Exemplary alcohols include, but are not limited to, ethanol, ethylhexanol, butanol, methanol, isopropanol, propanol, and mixtures thereof. An exemplary fluoroketone is 1,1,1,2,2,4,5,5,5-nonafluoro-4(trifluoromethyl)-3-pentanone.

(e) HCFOs include, but are not limited to, 1-chloro-3,3,3-trifluoropropene, 2-chloro-3,3,3-trifluoropropene (HCFO-1233xf) and dichlorotrifluoropropene (HCFO1223); and mixtures thereof.

(f) CFCs including, but not limited to, trifluorofluoromethane (R-11), dichlorodifluoromethane (CFC-12), CFC-113, CFC-114, CFC-115, and mixtures thereof.

(g) HCFCs include, but are not limited to, HCFC-123, HCFC-124, HCFC-141b, HCFC-142b, HCFC-22, 2-chloro-1,1,1,2-tetrafluoropropane, 2,3-dichloro-1,1,1-trifluoropropane, and mixtures thereof.

(h) HFEs including, but not limited to, CF3OCHF2, CHF2OCH2F3, CHF2OCHF2, HFEs of the formula Rf—O—Rh, where O is oxygen, Rf is a perfluoroalkyl group and Rh is a saturated, unsubstituted alkyl group, particularly C2F5OCH3, C4F9OC2H5, C4F9OCH3, C3F7OCH3. and mixtures thereof.

(i) chlorocarbons include, but are not limited to, trans-1,2-dichloroethylene, chloromethane, dichloromethane, trichloromethane, chloropropene isomers, 1,1,1,3,3-pentachloropropane, and mixtures thereof, particularly trans-1,2-dichloroethylene.

(j) water (k) carbon dioxide (l) atmospheric gases including, but not limited to, nitrogen, oxygen, and mixtures thereof.

In one embodiment of the present invention, the compositions comprise less than 5 wt % of an HCFC or CFC. In another embodiment of the present invention, the compositions comprise less than 2 wt % of an HCFC or CFC. In another embodiment of the present invention, the compositions comprise less than 0.01 wt % of an HCFC or CFC. In another embodiment of the present invention, the compositions comprise from 0.01 wt % to less than 2 wt % of an HCFC or CFC.

The compositions of the present invention may be prepared or created by any means known in the art, including, but not limited to, blending, inadvertent mixing, as co-products or impurities from production, due to contamination from equipment or vessels, components being separately charged to the same pieces of equipment, etc.

Flammability is an important property for many applications where it is very important or essential for the composition to be non-flammable, including particularly refrigerant and heat transfer applications, as solvents, and foam blowing agents. There are various methods of measuring the flammability of compounds and compositions, such as by measuring flash point or by ASTM E 681-01 as specified by ASHRAE Addendum 34p-92, as applicable. Preferably, the non-flammable compositions are non-flammable at ambient temperature and lower, preferably are non-flammable at 60° C. and lower, and even more preferably are non-flammable at 100° C. and lower. A greater range for non-flammability is beneficial by providing a greater degree of safety during use, storage, handling, or transport.

In one embodiment of the present invention, the nominal composition is non-flammable. It is realized that compositions of multiple components may fractionate into a liquid fraction and a vapor fraction that typically, but not always, have different compositions. It is a preferred embodiment of the present invention that both the liquid and the vapor fractions are non-flammable, particularly at elevated temperature. For instance, if a non-flammable composition of the present invention is being stored in a vessel and if that vessel were to leak, it is desirably that both the composition within the vessel and the composition leaking from the vessel are non-flammable; preferably if the vessel is leaking from either the vapor portion or from the liquid portion. It is also important that the non-flammable composition be non-flammable at elevated temperature even while the composition is exposed to low temperatures. Such a situation could be envisioned during operation of refrigeration or air conditioning equipment, which operate with some sections at very low temperatures. A leak of refrigerant from such colder sections may still be exposed to higher temperatures in the surrounding environment, such as an equipment room or around hot machinerary.

In an embodiment of the present invention, the compositions include a stabilizer or stabilizers selected from free radical scavengers, acid scavengers, oxygen scavengers, polymerization inhibitors, corrosion inhibitors and combinations thereof. The stabilizers of the present invention have minimal impact on the degradation of the hydrofluoroolefins and/or hydrochlorofluoroolefins when released into the atmosphere. Exemplary stabilizers include but are not limited to: 1,2-epoxybutane; glycidyl methyl ether; d,l-limonene; d,l-limonene oxide; 1,2-epoxy-2-methylpropane; nitromethane; diethylhydroxylamine; alpha-methylstyrene; isoprene; p-methoxyphenol; 3-mehoxyphenol; hydrazines; 2,6-di-t-butylphenol and hydroquinone.

In one embodiment of the present invention, the compositions include an organic acid or mixture of organic acids. Exemplary organic acids include, but are not limited to, citric acid, acetic acid, caprotic acid, isocaprotic acid, carboxylic acid, dicarboxylic acid, phosphinic acid, phosphonic acid, sulfonic acid, sulfonic acid, sulfamic acid, hydroxamic acid, formic acid, butyric acid, propionic acid, 2-ethylhexanoic acid, caprylic acid, cyanoacetic acid pyruvic acid, benzoic acid, oxalic acid, malonic acid, succinic acid, adipic acid, azelaic acid, trifluoroacetic acid, methanesulfonic acid, benzenesulfonic acid, and mixtures thereof. Preferably the organic acid is acetic acid.

Uses as Refrigerants and Heat Transfer Fluids:

The non-flammable compositions of the present invention may be used as refrigerants or heat transfer fluids in applications including, but not limited to, refrigeration, air conditioning, heat pumps, heat engines, heat pipes, and related applications.

In an embodiment of the present invention, "heat transfer fluid" or "refrigerant" means a compound or a fluid capable of absorbing heat as it evaporates at low temperature and low pressure and to reject heat by condensing at high temperature and high pressure in a vapor compression circuit. Generally, a refrigerant may include one, two, three or more compounds. In another embodiment of the present invention, "heat transfer fluid" or "refrigerant" means a compound or fluid capable of absorbing heat at low temperature and rejecting heat at higher temperature, with or without phase change; without phase change the "heat transfer fluid" is typically a liquid. In one embodiment of the present invention, "heat transfer fluid" or "refrigerant" means a compound or a fluid capable of absorbing heat as it evaporates and rejecting heat by condensing, such as in a heat pipe.

In an embodiment of the present invention, "heat transfer composition" means a composition comprising a heat transfer fluid and optionally one or more additives which are not compounds of heat transfer for the intended application.

In one embodiment of the present invention, the method of transferring heat is based on the use of a vapor compression system containing a heat transfer fluid. The method of heat transfer may be a method of heating or cooling of a fluid or a body. The vapor compression circuit containing a heat transfer fluid typically comprises at least one evaporator, a compressor, a condenser and an expansion valve, as well as transmission lines for the heat transfer fluid between these elements.

In a vapor compression system, different types of compressors can be used including, but not limited to, rotary compressors, reciprocating compressors, screw compressors, or, particularly, centrifugal compressors. Centrifugal compressor can be used in one or more stages or a mini-centrifugal compressor can be used. The compressor can be driven by an electric motor or a gas turbine (for example fed by the exhaust gases of a vehicle, for mobile applications) or gear driven. The installation may include a coupling with a turbine to generate electricity (Rankine cycle).

The installation may also optionally comprise at least one heat transfer fluid circuit to transmit heat used (with or without change of state) between the fluid circuit and the heat transfer fluid or body to be heated or cooled.

The installation may also optionally comprise two or more vapor compression circuits, containing heat transfer fluids that are identical or different. For example, more than one vapor compression circuits can be coupled together.

A vapor compression circuit typically operates according to a conventional cycle of vapor compression. The cycle includes the change of state of heat transfer fluid from a liquid phase (or two-phase liquid/vapor) to a vapor phase at a relatively low pressure, then the compression of the fluid in the vapor phase to a relatively high pressure, the change of state (condensation) of the fluid heat transfer from the vapor to the liquid phase at a relatively high pressure, and reducing the pressure to begin the cycle.

In the case of a method for cooling, the heat from the fluid or the body which is cooled (directly or indirectly, via a heat transfer fluid) is absorbed by the heat transfer fluid, on evaporation of the latter, and at a relatively low temperature compared to the environment.

In the case of a heating process, heat is transferred (directly or indirectly, via a heat transfer fluid) to the heat transfer fluid, during the condensation thereof at a temperature relatively high compared to the environment. The installation for implementing the heat transfer in this case is called a "heat pump".

One embodiment of the present invention is methods of heat transfer at high temperature, that is to say, for which the condensation temperature of the heat transfer fluid is greater than or equal to 70° C., or even 80° C. Generally, the condensing temperature is less than or equal to 150° C. Preferably, the condensation temperature is from 90 to 140° C.

Vapor-compression refrigeration, air-conditioning, or heat pump systems typically include an evaporator, a compressor, a condenser, and an expansion device. A vapor-compression cycle re-uses refrigerant in multiple steps producing a cooling effect in one step and a heating effect in a different step. A typical cycle can be described simply as follows: liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle. A heat pump is a device typically used to move heat from one source (a "source") to another (a "sink"); a reversible heat pump can be used to heat or cool, depending upon operation. In HVACR operations, a heat pump is typically a vapor-compression refrigerating device that includes a reversing valve to reverse the direction of heat flow. Heat engines, such as Rankine Cycles and Organic Rankine Cycles, are typically used to convert heat energy into mechanical work, particularly for power generation. Various refrigerant and heat transfer applications operate with parts of the systems at significantly elevated temperature, such as with heat pump water heater, high temperature heat pumps and Organic Rankine Cycles, which may have system operating temperatures in excess of 40° C., or in excess of 60° C., or in excess of 70° C., or even in excess of 100° C. For example, a high temperature heat pump or heat pump water heater may operate with a condensing temperature in excess of 70° C.

The non-flammable compositions of the present invention may be useful in stationary air-conditioning, heat pumps, and heat engines, e.g. chillers, high temperature heat pumps, residential and light commercial and commercial air-conditioning systems. In stationary refrigeration applications, the present non-flammable compositions may be useful in equipment such as domestic refrigerators, ice machines, walk-in and reach-in coolers and freezers, and supermarket systems. In a preferred embodiment the non-flammable compositions of the present invention are useful in chillers, high temperature heat pumps, organic rankine cycles, rankine cycles, and as secondary coolants or heat transfer fluids.

In one embodiment of the present invention, the compositions are used as refrigerants for chillers. Chillers are refrigeration machines that cool water, other heat transfer fluids, or process fluids by a vapor-compression (modified reverse-Rankine), absorption. or other thermodynamic cycle. Their most common use is in central systems to air condition large office, commercial, medical, entertainment, residential high-rise, and similar buildings or clusters of buildings. Both large central and interconnected plants, generally with multiple chillers in each, are common for shopping centers, university, medical, and office campuses; military installations; and district cooling systems. The chilled water (or less commonly a brine or other heat-transfer fluid) is piped through the building or buildings to other devices, such as zoned air handlers, that use the cooled water or brine to air condition (cool and dehumidify) occupied or controlled spaces. By their nature, both efficiency and reliability are critical attributes of chillers. Chillers typically range in thermal capacity from approximately 10 kW (3 ton) to exceeding 30 MW (8,500 ton), with a more common range of 300 kW (85 ton) to 14 MW (4,000 ton). Larger systems typically employ multiple chillers, with some installations exceeding 300 MW (85,000 ton) of cooling. Liquid-chilling systems cool water, brine, or other secondary coolant for air conditioning or refrigeration. The system may be either factory-assembled and wired or shipped in sections for erection in the field. The most frequent application is water chilling for air conditioning, although brine cooling for low temperature refrigeration and chilling fluids in industrial processes are also common.

The basic components of a vapor-compression, liquid-chilling system include a compressor, liquid cooler (evaporator), condenser, compressor drive, liquid-refrigerant expansion or flow control device, and control center; it may also include a receiver, economizer, expansion turbine, and/or subcooler. In addition, auxiliary components may be used, such as a lubricant cooler, lubricant separator, lubricant-return device, purge unit, lubricant pump, refrigerant transfer unit, refrigerant vents, and/or additional control valves.

In a typical liquid-chilling system, liquid (usually water) enters the cooler, where it is chilled by liquid refrigerant evaporating at a lower temperature. The refrigerant vaporizes and is drawn into the compressor, which increases the pressure and temperature of the gas so that it may be condensed at the higher temperature in the condenser. The condenser cooling medium is warmed in the process. The condensed liquid refrigerant then flows back to the evaporator through an expansion device. Some of the liquid refrigerant changes to vapor (flashes) as pressure drops between the condenser and the evaporator.

In a non-limiting, exemplary refrigeration cycle of a basic liquid chiller system, chilled water enters the cooler at 54° F., for example, and leaves at 44° F. Condenser water leaves a cooling tower at 85° F., enters the condenser, and returns to the cooling tower near 95° F. Condensers may also be cooled by air or evaporation of water. This system, with a single compressor and one refrigerant circuit with a water-cooled condenser, is used extensively to chill water for air conditioning because it is relatively simple and compact. The compressor can be a reciprocating, scroll, screw, or centrifugal compressor. The preferred systems of the present invention are centrifugal liquid chiller systems.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outwardly. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

Heat exchangers used in heat transfer systems can include flooded units (eg. flooded evaporators), shell-and-tube heat exchanges, plate-plate heat exchanges, double-wall heat exchangers, micro-channel heat exchangers, heat pipes.

When used as refrigerants, the non-flammable compositions of the present invention typically may be used with refrigeration lubricants, i.e. those lubricants suitable for use with refrigeration, air-conditioning, or heat pump apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems". Lubricants of the present invention may comprise those commonly known as "mineral oils" in the field of compression refrigeration lubrication. mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Lubricants of the present invention further comprise those that have been designed for use with hydrofluorocarbon refrigerants and are miscible with refrigerants of the present invention under compression refrigeration, air-conditioning, or heat pump apparatus' operating conditions. Such lubricants include, but are not limited to, polyol esters (POEs) such as Castrol RTM 100 (Castrol, United Kingdom), polyalkylene glycols (PAGs) such as RL-488A from Dow (Dow Chemical, Midland, Mich.), and polyvinyl ethers (PVEs). These lubricants are readily available from various commercial sources.

The following is a exemplary description of polyol ester (POE) lubricating oils and is not meant to limit the scope of the present invention in any way. POE oils are typically formed by a chemical reaction (esterification) of a carboxylic acid, or mixture of carboxylic acids, with an alcohol, or mixtures of alcohols. The carboxylic acids are typically mono-functional or di-functional. The alcohols are typically mono-functional or poly-functional (polyols). The polyols are typically di-, tri-, or tetra-functional. Examples of polyols include, but are not limited to, neopentylglycol, glycerin, trimethylolpropane, pentaerythritol, and mixtures thereof. Examples of carboxylics acids include, but are not limited to, ethyl hexanoic acid, including 2-ethyl hexanoic acid, trimethyl hexanoic acid, including 3,5,5-trimethyl hexanoic acid, octanoic acid, including linear octanoic acid, pentanoic acid, including n-pentanoic acid, neo acids, including dimethylpentanoic acid, C5 to C20 carboxylic acids, and mixtures thereof. The carboxylic acids may also be derived from natural sources, including, but not limited to, plant and vegatable oils of soybean, palm, olive, rapeseed, cottonseed, coconut, palm kernal, corn, castor, sesame, jojoba, peanut, sunflower, others, and mixtures thereof. Natural oil carboxylic acids are typically C18 acids but also include C12-C20 acids, among others. In one embodiment of the present invention, the POE oil is formulated using one or more mono-functional carboxylic acid with one or more polyol. In one embodiment of the present invention, the POE oil is formulated using one or more di-functional carboxylic acid with one or more mono-functional alcohol. In one embodiment of the present invention, the POE oil is a mixture of different POE oils. In one embodiment of the present invention, the POE oil is formulated using one or more C5-C10 carboxylic acids.

Examples of polyalkylene glycol (PAG) lubricants include straight chain or branched polyalkylene glycols. The PAG may be a homopolymer or copolymer of oxyalkylene groups, preferably a homopolymer oxypropylene or a copolymer of oxypropylene and oxyethylene. In certain embodiments the polyalkylene glycols may be hydroxyl terminated, di-alkoxy terminated, terminated with alkyl groups containing from 1 to 10 carbon atoms, terminated with 1 to 10 carbon atom alkyl groups containing heteroatoms such as nitrogen, and combinations thereof.

In a preferred embodiment of the present invention, the optional lubricant is selected from mineral oils, polyol ester oils, or polyvinyl ether oils.

In preferred embodiments, the lubricants of this invention have viscosities of from about 1 to 1000 centistokes at about 37° C., more preferably in the range of from about 10 to about 200 centistokes at about 37° C. and even more preferably of from about 30 to about 150 centistokes.

Good understanding of the chemical interactions of the refrigerant, lubricant, and metals in a refrigeration system is necessary for designing systems that are reliable and have a long service life. Incompatibility between the refrigerant and other components of or within a refrigeration or heat transfer system can lead to decomposition of the refrigerant, lubricant, and/or other components, the formation of undesirable byproducts, corrosion or degradation of mechanical parts, loss of efficiency, or a general shortening of the service life of the equipment, refrigerant and/or lubricant.

The stability of combinations of refrigerant and lubricant can be evaluated in terms of thermal stability, chemical stability, oxidative stability, and hydrolytic stability. Copper plating is also a measure of compatibility of refrigerant and lubricant mixtures. The stability of refrigerant and lubricant mixtures can be affected by the content of air or oxygen, water, metals, or other impurities. In one embodiment of the present invention, the heat transfer fluids preferably have a low moisture content, more preferably where the water content is less than about 1000 ppm, even more preferably where the water content is less than about 500 ppm, even more preferably where the water content is less than about 300 ppm, even more preferably where the water content is less than about 100 ppm, and even more preferably where the water content is less than about 50 ppm. In one embodiment of the present invention, the non-flammable compositions preferably have a low content of air or oxygen. In one embodiment of the present invention, the non-flammable compositions preferably have a low metals and/or metal ion content.

Lubricants of the present invention are selected by considering a given compressor's requirements and the environment to which the lubricant will be exposed. Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, foaming and antifoam control agents, leak detectants, odorants, and the like. In general, these additives are present only in small amounts relative to the overall lubricant composition. They are typically used at concentrations of from less than about 0.1% to as much as about 3% of each additive. These additives are selected on the basis of the individual system requirements. Some typical examples of such additives may include, but are not limited to, lubrication enhancing additives, such as alkyl or aryl esters of phosphoric acid and of thiophosphates. Additionally, the metal dialkyl dithiophosphates and other members of this family of chemicals may be used in compositions of the present invention. Other antiwear additives include natural product oils and asymmetrical polyhydroxyl lubrication additives such as Synergol TMS (International Lubricants).

Uses as Blowing Agents:

Thermoset foams such as rigid polyurethane foams can be prepared by mixing, under controlled conditions, MDI, polyols, blowing agents and additives i.e. catalysts, surfactants, water, and fire retardants. Different type of polyols can be used, typically in combination with polymeric MDI, and additives are typically preblended into the polyol. The formation of highly cross-linked homogeneous glassy network structure is essential for the final properties of the resulting foam. These properties include good heat stability, high compression strength at low density and good bather properties.

In order to achieve optimum processing and end properties simultaneously a large number of formulations are required. One of key properties of rigid polyurethane foam is low thermal conductivity that is achieved by producing fine and closed-cell foam of the required density using water and a physical co-blowing agent. The physical blowing agent needs to have a low thermal conductivity as it stays in the cells and contributes to the level and stability of thermal conductivity of the foams.

For rigid polyurethane foam the initial exothermic reaction is normally between isocyanate and water, leading to the formation of am amine and carbon dioxide; the amine then reacts with more isocyanate to form polyurea. The other key exothermic reactions are between isocyanate and polyol, producing polyurethane and isocyanate trimerisation. Appropriate catalysts are selected for specific functions, such as, blowing, gelling and trimerisation to control the overall reaction rates and balance among them.

Once the isocyanate and polyol blend are thoroughly mixed there is normally a 30-fold increase in volume upon reaction and the formation of individual cell is related to the presence of nuclei in the mixture. Cell formation and stabilization are also related to the right surfactant. The rigid foam polymer structure becomes self-supporting once enough network formation has established.

Polyols may be monomeric, polymeric, or mixtures thereof. Polymeric polyols include, but are not limited to, polyethers or polyesters. Examples of monomeric polyols include, but are not limited to, glycerin, pentaerythritol, ethylene glycol and sucrose, and may be starting points for the production of polymeric polyols. Additional examples of polyols include sucrose containing polyol; phenol; a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; or combinations thereof.

The center of the foam can reach temperatures as high as 190° C. due to the exothermic reactions, however, the reaction is not completed at the end of foam rise and can go on for many hours. Similarly, it can take several days for the center of the foam to completely cool down to ambient temperature.

The non-flammable compositions of the present invention can be used as a foaming agent for polyurethane foams by being mixed in a polyol mixture (typically referred to as the B side) which form foam when mixed with a polymeric MDI mixture (typically referred to as the A side). The non-flammable compositions of the present invention are particularly well suited for polyurethane spray foam applications, such as for roofing or cavity fill insulation, where the risks of using flammable foaming agents are difficult to mitigate.

For the production of thermoplastic foams, the preferred non-flammable compositions of the present invention will have boiling points less than the melt and/or glass transition temperature of the polymer resin, typically less than about 100° C.

The process for preparing a foamed thermoplastic product is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers. In certain embodiments of the present invention the thermoplastic comprises an alkyl aromatic polymer, preferably of styrene, styrene-acrylonitrile, and mixtures thereof. In certain embodiments of the present invention the thermoplastic comprises a polyolefin, preferably polyethylene, polypropylene, and mixtures thereof.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such as azodicarbonamide or sodium bicarbonate and citric acid. IR attenuating agents and thermally insulating additives include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

In other embodiments the invention provides foamable compositions, and preferably polyurethane, polyisocyanate and thermoplastic foam compositions such as EPS and XPS foams, and method of preparing foams. In such foam embodiments, one or more of the non-flammable compositions of the present invention are included as a blowing agent in foamable compositions, which composition preferably includes one or more additional components capable of reacting and foaming under the proper conditions to form a foam or cellular structure. Any of the methods well known in the art may be used or adapted for use in accordance with the foam embodiments of the present invention.

The present invention further relates to a method of forming a foam comprising: (a) adding to a foamable composition a non-flammable composition of the present invention; and (b) reacting the foamable composition under conditions effective to form a foam.

Due to the high temperatures that may exist during foaming processes, it is desirable that the blowing agent be non-flammable at elevated temperature. For example, a polymer foam extruder may operate up to or exceeding 200° C. and with foamable polymer compositions, such as comprising HCFO-1233zd and polystyrene, exiting the extruder at a temperature of up to 100° C. or more.

Uses as Aerosol Propellants:

Another embodiment of the present invention relates to the non-flammable compositions of the present invention for use as propellants in sprayable compositions. Additionally, the present invention relates to a sprayable composition comprising the non-flammable composition of the present invention. The active ingredient to be sprayed together with inert ingredients, solvents and other materials may also be present in a sprayable composition. Preferably, the sprayable composition is an aerosol. Suitable active materials to be sprayed include, without limitations, cosmetic materials, such as deodorants, perfumes, hair sprays, cleaners, and polishing agents as well as medicinal materials such as anti-asthma and anti-halitosis medications.

The present invention further relates to a process for producing aerosol products comprising the step of adding a composition of the present invention as described herein to active ingredients in an aerosol container, wherein said composition functions as a propellant.

Uses as Fire Fighting Agents:

A further embodiment provides methods of extinguishing or suppressing a fire in a total-flood application providing an agent comprising a non-flammable composition of the present invention of the present invention; disposing the agent in a pressurized discharge system; and discharging the agent into an area to extinguish or suppress fires in that area. Another embodiment provides methods of inerting an area to prevent a fire or explosion comprising providing an agent comprising a non-flammable composition of the present invention; disposing the agent in a pressurized discharge system; and discharging the agent into the area to prevent a fire or explosion from occurring.

The term "extinguishment" is usually used to denote complete elimination of a fire; whereas, "suppression" is often used to denote reduction, but not necessarily total elimination, of a fire or explosion. As used herein, terms "extinguishment" and "suppression" will be used interchangeably. There are four general types of halocarbon fire and explosion protection applications. (1) In total-flood fire extinguishment and/or suppression applications, the agent is discharged into a space to achieve a concentration sufficient to extinguish or suppress an existing fire. Total flooding use includes protection of enclosed, potentially occupied spaces such, as computer rooms as well as specialized, often unoccupied spaces such as aircraft engine nacelles and engine compartments in vehicles. (2) In streaming applications, the agent is applied directly onto a fire or into the region of a fire. This is usually accomplished using manually operated wheeled or portable units. A second method, included as a streaming application, uses a "localized" system, which discharges agent toward a fire from one or more fixed nozzles. Localized systems may be activated either manually or automatically. (3) In explosion suppression, a non-flammable composition of the present invention is discharged to suppress an explosion that has already been initiated. The term "suppression" is normally used in this application because the explosion is usually self-limiting. However, the use of this term does not necessarily imply that the explosion is not extinguished by the agent. In this application, a detector is usually used to detect an expanding fireball from an explosion, and the agent is discharged rapidly to suppress the explosion. Explosion suppression is used primarily, but not solely, in defense applications. (4) In inertion, a non-flammable composition of the present invention is discharged into a space to prevent an explosion or a fire from being initiated. Often, a system similar or identical to that used for total-flood fire extinguishment or suppression is used. Usually, the presence of a dangerous condition (for example, dangerous concentrations of flammable or explosive gases) is detected, and the non-flammable composition of the present invention is then discharged to prevent the explosion or fire from occurring until the condition can be remedied.

The extinguishing method can be carried out by introducing the composition into an enclosed area surrounding a fire. Any of the known methods of introduction can be utilized provided that appropriate quantities of the composition are metered into the enclosed area at appropriate intervals. For example, a composition can be introduced by streaming, e.g. using conventional portable (or fixed) fire extinguishing equipment; by misting; or by flooding, e.g., by releasing (using appropriate piping, valves, and controls) the composition into an enclosed area surrounding a fire. The composition can optionally be combined with an inert propellant, e.g., nitrogen, argon, decomposition products of glycidyl azide polymers or carbon dioxide, to increase the rate of discharge of the composition from the streaming or flooding equipment utilized.

Preferably, the extinguishing process involves introducing a non-flammable composition of the present invention to a fire or flame in an amount sufficient to extinguish the fire or flame. One skilled in this field will recognize that the amount of flame suppressant needed to extinguish a particular fire will depend upon the nature and extent of the hazard. When the flame suppressant is to be introduced by flooding, cup burner, test data is useful in determining the amount or concentration of flame suppressant required to extinguish a particular type and size of fire.

Uses as Solvents and Cleaners:

The ideal non-flammable composition of the present invention, suitable for solvent applications, should have a boiling point between about 10-60° C. The product should be chemically stable in contact with metals and resistant to swelling upon exposure to various plastic such as acrylonitrile butadiene styrene, PVC, polybutyelene tetraphathlate, polyethylene HD, polyethylene LD, polymethyle methacrylate, polyethylene, high impact polystyrene, polystyrene crystals, polystyrene 1160, polypropylene, polyamide 11, polycarbonate, polyvinylidene fluoride, polyetehrer block amide; or elastomeric material such as styrene butadiene 6510, ethylene propylene EP710, hydrogenated nitrile 7DT1566, polychloroprene N658, polyacrylates DA 65, hyplalon DH70, fluorocarbon df, nitrile PB701, silicone SL1002, polyisoprene polybutadiene c6514, Teflon® 62945R.

The non-flammable compositions of the present invention also provide methods of removing containments from a product, part, component, substrate, or any other article or portion thereof by applying to the article a composition of the present invention i.e. solvent/cleaning applications. For the purposes of convenience, the term "article" is used herein to refer to all such products, parts, components, substrates, and the like and is further intended to refer to any surface or portion thereof. Furthermore, the term "contaminant" is intended to refer to any unwanted material or substance present on the article, even if such substance is placed on the article intentionally. For example, in the manufacture of semiconductor devices it is common to deposit a photoresist material onto a substrate to form a mask for the etching operation and to subsequently remove the photoresist material from the substrate. The term "contaminant" as used herein is intended to cover and encompass such a photo resist material.

Preferred methods of the present invention comprise applying the present non-flammable compositions to the article, with vapor degreasing and solvent cleaning methods being particularly preferred for certain applications, especially those intricate parts and difficult to remove soils. Preferred vapor degreasing and solvent cleaning methods consist of exposing an article, preferably at room-temperature, to the vapors of a boiling solvent. Vapors condensing on the object have the advantage of providing a relatively clean, distilled solvent to wash away grease or other contamination. Such processes thus have an additional advantage in that final evaporation of the present solvent composition from the object leaves behind relatively little residue as compared to the case where the object is simply washed in liquid solvent.

For applications in which the article includes contaminants that are difficult to remove, it is preferred that the present methods involve raising the temperature of the solvent/cleaner non-flammable composition of the present invention above ambient or to any other temperature that is effective in such application to substantially improve the cleaning action of the solvent/cleaner. Such processes are also generally preferred for large volume assembly line operations where the cleaning of the article, particularly metal parts and assemblies, must be done efficiently and quickly.

In preferred embodiments, the cleaning methods of the present invention comprise immersing the article to be cleaned in liquid solvent/cleaner at an elevated temperature, and even more preferably at about the boiling point of the solvent. In such operations, this step preferably removes a substantial amount, and even more preferably a major portion, of the target contaminant from the article. This step is then preferably followed by immersing the article in solvent/cleaner, preferably freshly distilled solvent, which is at a temperature below the temperature of the liquid solvent in the preceding immersion step, preferably at about ambient or room temperature. The preferred methods also include the step of then contacting the article with relatively hot vapor of the present solvent/cleaner composition, preferably by exposing the article to solvent/cleaner vapors rising from the hot/boiling solvent/cleaner associated with the first mentioned immersion step. This preferably results in condensation of the solvent/cleaner vapor on the article. In certain preferred embodiments, the article may be sprayed with distilled solvent/cleaner before final rinsing.

It is contemplated that numerous varieties and types of vapor degreasing equipment are adaptable for use in connection with the present methods. The present solvent/cleaning methods may also comprise cold cleaning in which the contaminated article is either immersed in the fluid composition of the present invention under ambient or room temperature conditions or wiped under such conditions with rags or similar objects soaked in solvents/cleaners.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

EXAMPLES

Flammability testing was performed in accordance with ASTM E 681-09. Briefly, the test procedure comprises: Testing conducted in a 12L glass flask test globe. An electronic spark ignition source is used that consists of 18 ga tungsten wire electrodes with a ¼ inch gap and typically a 0.4 sec spark duration. The test globe is brought to the required temperature. The system is evacuated. The composition to test is added to the test globe at the quantity required to reach to desired volume percent in air. The system is then brought to ambient barometric pressure with air (at controlled humidity). The test globe contents are mixed. The ignition source is ignited. A test sample is defined as flammable when there is an upward and outward flame extension from the point of ignition to the walls of the flask wall which is continuous along an arc that is greater than a 90-degree angle as measured from the point of ignition to the walls of the flask.

In such tests, HFO-1234ze is flammable, HFC-245fa is non-flammable and HFO-1234ze is non-flammable at room temperature but flammable at higher temperature, e.g. 60° C. and 100° C.

Comparative Example 1

Flammability tests described above were conducted on a vapor sample of trans-HCFO-1233zd containing approximately: 2.06% trans-HFO-1234ze, 0.73% HFO-1243zf, 0.19% cis-HFO-1234ze, 0.16% HFC-245fa. At a test temperature of 100° C. the sample was found to be flammable.

Comparative Example 2

Flammability tests described above were conducted on a sample of trans-HCFO-1233zd with a liquid portion containing approximately: 0.17 wt % trans-HFO-1234ze, 0.08% HFO-1243zf, 0.06% cis-HFO-1234ze, 0.07% HFC-245fa. At a test temperature of 60° C. the sample was found to be flammable.

Comparative Example 3

Flammability tests described above were conducted on a sample of trans-HCFO-1233zd with a liquid portion containing approximately: 0.18 wt % trans-HFO-1234ze, 0.08% HFO-1243zf, 0.06% cis-HFO-1234ze, 0.07% HFC-245fa. At a test temperature of 100° C. the sample was found to be flammable.

Comparative Example 4

Flammability tests described above were conducted on a vapor sample of trans-HCFO-1233zd containing approximately: 2.2 wt % trans-HFO-1234ze, 0.8% HFO-1243zf, and 0.17% HFC-245fa. At a test temperature of 60° C. the sample was found to be flammable.

Example 5

Flammability tests described above were conducted on a sample of trans-HCFO-1233zd with a liquid portion containing approximately: 0.003 wt % trans-HFO-1234ze, 0.00004% HFO-1243zf, 0.02% cis-HFO-1234ze, 0.018% HFC-245fa. The sample was found to be non-flammable at 100° C., 60° C., and at room temperature.

Example 6

Flammability tests described above were conducted on a vapor sample of trans-HCFO-1233zd containing approximately: 0.1 wt % HFO-1234ze and 0.1% HFC-245fa. At a test temperature of 100° C. the sample was found to be non-flammable at from 3 vol % to 22 vol % in air.

Example 7

Flammability tests described above were conducted on a sample of trans-HCFO-1233zd with a liquid portion containing approximately: 0.62 wt % trans-HFO-1234ze, 0.0002% HFO-1243zf, 0.08% cis-HFO-1234ze, 0.11% HFC-245fa. At a test temperature of 60° C. the sample was found to be non-flammable.

Example 8

Flammability tests described above were conducted on a sample of trans-HCFO-1233zd containing approximately 4 wt % trans-1234ze. At a test temperature of 100° C. the sample was found to be non-flammable. The observed upward and outward flame extension was continuous to almost a 90-degree angle as measured from the point of ignition but not sufficient to be deemed flammable.

The invention claimed is:

1. A non-flammable composition comprising (1) greater than 99 wt % 1-chloro-3,3,3-trifluoropropene and (2) from between about 0.02 to 0.7 wt % of 1,3,3,3-tetrafluoropropene and (3) from between about 0.00004 to 0. 0002 wt % 3,3,3-trifluoropropene and (4) from about 0.01 to 0.2 wt % 1,1,1,3,3-pentafluoropropane wherein said composition is non-flammable at at least one temperature between about 60° C. to about 100° C. when tested in accordance with ASTM 681-09.

2. The non-flammable composition of claim 1 where the vapor of said composition is non-flammable at at least one temperature from between 100° C. to 20° C. when mixed with humid air at at least once concentration from between 3vol % to 22vol %, where the humidity of the air is approximately 50% relative humidity.

3. The non-flammable composition of claim 1 where the 1-chloro-3,3,3-trifluoropropene is greater than 70% the trans-isomer.

4. The non-flammable composition of claim 1 where the 1-chloro-3,3,3-trifluoropropene is greater than 90% the trans-isomer.

5. The non-flammable composition of claim 1 where the 1-chloro-3,3,3-trifluoropropene is greater than 95% the trans-isomer.

6. The non-flammable composition of claim 1 where the 1-chloro-3,3,3-trifluoropropene is greater than 99% the trans-isomer.

* * * * *